United States Patent
Yoshinaga et al.

(10) Patent No.: US 10,338,361 B2
(45) Date of Patent: Jul. 2, 2019

(54) IMAGING OPTICAL SYSTEM, IMAGING APPARATUS, AND CAMERA SYSTEM

(71) Applicant: Panasonic Intellectual Property Management Co., Ltd., Osaka (JP)

(72) Inventors: Shunichiro Yoshinaga, Osaka (JP); Hiroaki Suzuki, Osaka (JP); Yoshiaki Kurioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/936,518

(22) Filed: Mar. 27, 2018

(65) Prior Publication Data

US 2018/0299657 A1    Oct. 18, 2018

(30) Foreign Application Priority Data

Apr. 17, 2017  (JP) ................. 2017-081014

(51) Int. Cl.
  *G02B 15/17*  (2006.01)
  *G02B 15/177*  (2006.01)
(52) U.S. Cl.
  CPC ................. *G02B 15/177* (2013.01)
(58) Field of Classification Search
  CPC .................................. G02B 15/177
  USPC ........................................... 359/679
  See application file for complete search history.

(56) References Cited

U.S. PATENT DOCUMENTS

| 2010/0295985 A1 | 11/2010 | Matsusaka |
| 2012/0019928 A1 | 1/2012 | Sato |
| 2016/0178877 A1 | 6/2016 | Inoue |

FOREIGN PATENT DOCUMENTS

| JP | 3-050515 | 3/1991 |
| JP | 2011-002817 | 1/2011 |
| JP | 2012-027283 | 2/2012 |
| JP | 2015-114553 | 6/2015 |
| JP | 2015-114625 | 6/2015 |
| JP | 2016-118658 | 6/2016 |

*Primary Examiner* — Wen Huang
(74) *Attorney, Agent, or Firm* — Wenderoth, Lind & Ponack, L.L.P.

(57) ABSTRACT

An imaging optical system includes, in order from an object side to an image side, a first lens group having negative optical power, a second lens group having positive optical power, a third lens group having negative optical power, and a fourth lens group with negative optical power. A lens disposed closest to the object side in the second lens group has a concave surface directed toward the object side, and a lens disposed closest to the object side in the fourth lens group has positive optical power. Each distance between the lens groups changes when zooming from a wide-angle end to a telephoto end on photographing.

9 Claims, 10 Drawing Sheets

IMAGING OPTICAL SYSTEM, IMAGING APPARATUS, AND CAMERA SYSTEM

BACKGROUND

1. Technical Field

The present disclosure relates to an imaging optical system that can satisfactorily correct aberrations, and an imaging apparatus and a camera system employing the imaging optical system.

2. Description of the Related Art

Japanese Patent Unexamined Publication No. 2012-27283 discloses a zoom lens that includes, in order from an object side to an image side, a first lens group having negative optical power, a second lens group having positive optical power, a third lens group having negative optical power, a fourth lens group having negative optical power, and a fifth lens group having positive optical power. The zoom lens changes magnification by moving the first lens group, the second lens group, the third lens group, and the fourth lens group in an optical-axis direction.

SUMMARY

An object of the present disclosure is to offer an imaging optical system that can satisfactorily correct aberrations, and an imaging apparatus and a camera system employing the imaging optical system.

The imaging optical system of the present disclosure includes, in order from an object side to an image side, a first lens group having negative optical power, a second lens group having positive optical power, a third lens group having negative optical power, and a fourth lens group having negative optical power. A lens disposed closest to the object side in the second lens group has a concave surface directed toward the object side, and a lens disposed closest to the object side in the fourth lens group has positive optical power. When zooming from a wide-angle end to a telephoto end on photographing, each distance between the lens groups changes.

The present disclosure enables to offer an imaging optical system that can satisfactorily correct aberrations, and an imaging device and a camera system employing the imaging optical system.

DETAILED DESCRIPTION

Hereinafter, exemplary embodiments are detailed with reference drawings as appropriate. However, a detailed description more than necessary may be omitted, such as a detailed description of a well-known item and a duplicate description for a substantially identical structure. This is to avoid an unnecessarily redundant description and allow those skilled in the art to easily understand the following description.

Note that accompanying drawings and the following description are provided for those skilled in the art to well understand the present disclosure and do not intend to limit the subjects described in the claims by the drawings and the description.

First Through Fourth Exemplary Embodiments

FIGS. 1, 3, 5, and 7 are lens layout diagrams of imaging optical systems in the first to fourth exemplary embodiments, respectively. Each figure shows the imaging optical system in an infinity focusing state.

In FIGS. 1, 3, 5, and 7, part (a) shows a lens configuration at a wide-angle end (State of the shortest focal length: Focal length fW). Part (b) shows a lens configuration at an intermediate position (State of the intermediate focal length: Focal length $fM=\sqrt{(fW*fT)}$). Part (c) shows a lens configuration at a telephoto end (State of the longest focal length: Focal length fT). Parts (a), (b), and (c) have the same aspect ratio.

In addition, in FIGS. 1, 3, 5, and 7, lines with arrows between parts (a) and (b) are straight lines connecting positions of the lens groups in each state of the wide-angle end (Wide), intermediate position (Mid), and telephoto end (Tele), in sequence from the top. Parts between the wide-angle end and the intermediate position, and between the intermediate position and the telephoto end are simply connected by straight lines, which is different from actual movement of each lens group.

Furthermore, in FIGS. 1, 3, 5, and 7, arrows on the lens groups indicate focusing from the infinity focusing state to the proximity focusing state. Since a reference mark of each lens group is indicated below the position of each lens group in part (a), an arrow indicating focusing is placed, for the convenience, below this reference mark of each lens group in FIGS. 1, 3, 5, and 7. A movement direction of each lens group on focusing in each zooming state is detailed later in each exemplary embodiment.

In FIGS. 1, 3, 5, and 7, asterisk (*) marked on a specific surface represents that the surface is aspheric. Still more, symbol (+) and symbol (−) affixed to the reference mark of each lens group in FIGS. 1, 3, 5, and 7 correspond to a sign of the optical power of each lens group. The straight line at the rightmost in FIGS. 1, 3, 5, and 7 indicates the position of image surface S (a surface of image sensor to the object side).

First Exemplary Embodiment

Figure 1:
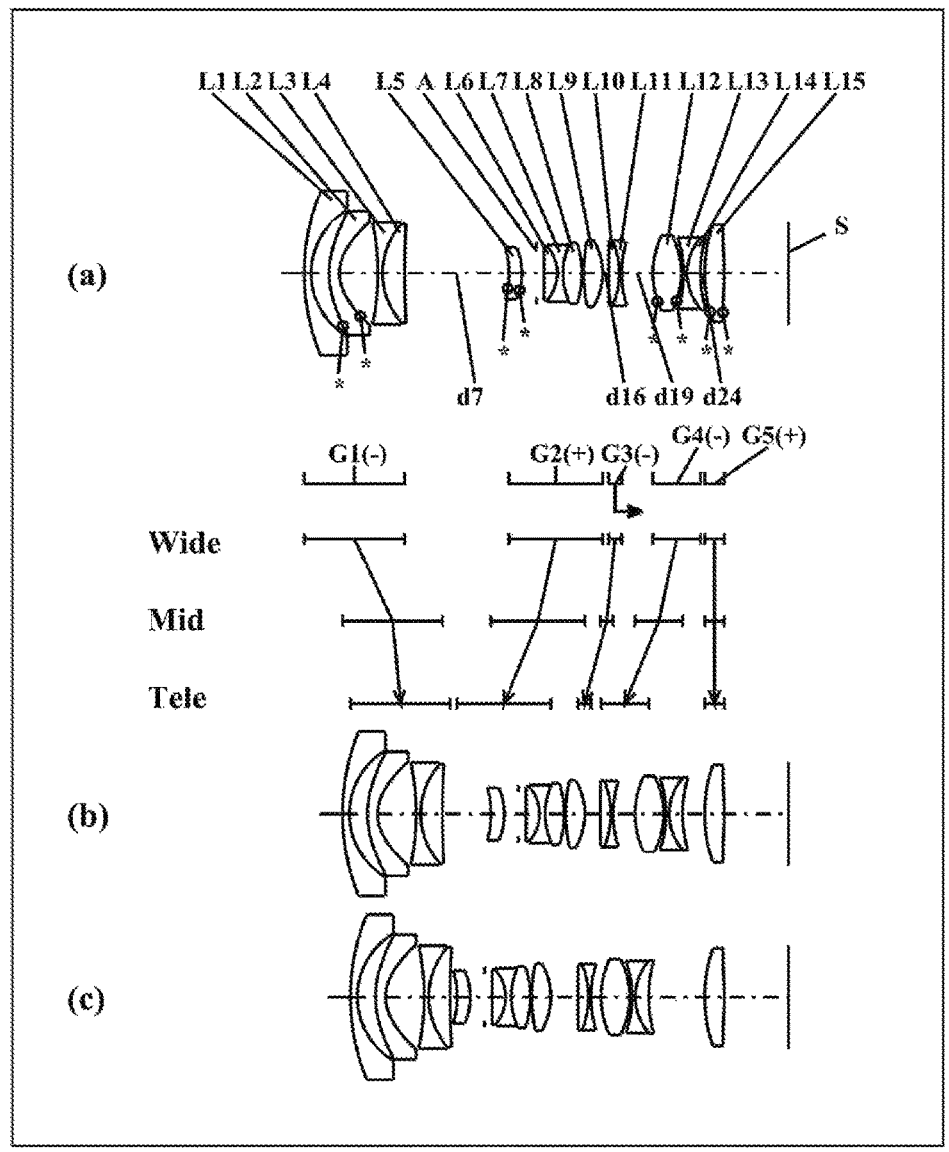
FIG. 1 is a lens layout diagram of an imaging optical system showing an infinity focusing state in accordance with a first exemplary embodiment (numerical practical example 1).
Figure 2:
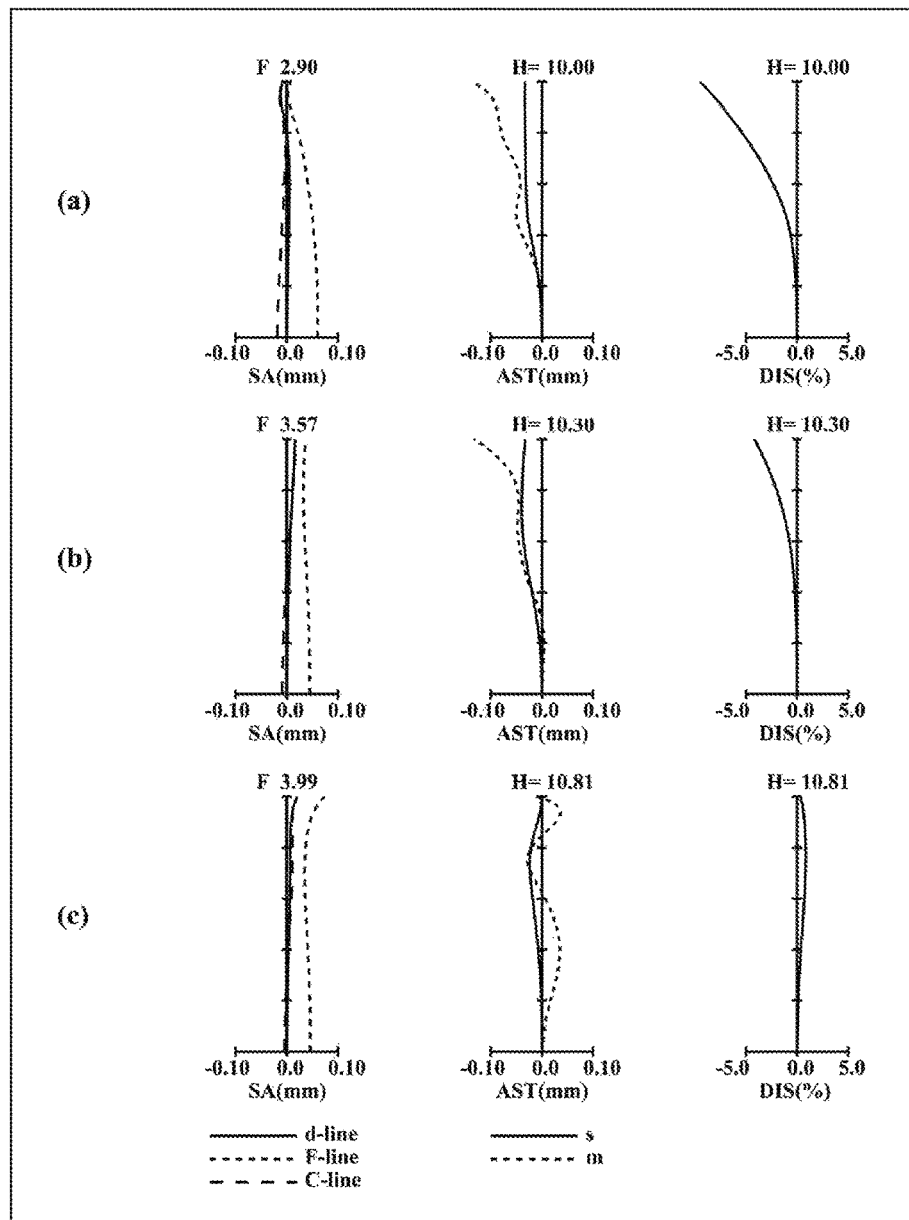
FIG. 2 is a longitudinal aberration diagram of the imaging optical system in the infinity focusing state in accordance with numerical practical example 1.

FIG. 1 is the imaging optical system in the first exemplary embodiment.

The imaging optical system includes, in order from the object side to the image side, first lens group G1 having negative optical power, second lens group G2 having positive optical power, third lens group G3 having negative optical power, fourth lens group G4 having negative optical power, and fifth lens group G5 having positive optical power.

First lens group G1 includes, in order from the object side to the image side, first lens L1 having negative optical power, second lens L2 having negative optical power, third lens L3 having negative optical power, and fourth lens L4 having positive optical power. Third lens L3 and fourth lens L4 are bonded, typically with an adhesive, to configure cemented lenses.

Second lens group G2 includes, in order from the object side to the image side, fifth lens L5 having positive optical power, aperture stop A, sixth lens L6 having positive optical power, seventh lens L7 having negative optical power, eighth lens L8 having positive optical power, and ninth lens L9 with positive optical power. Sixth lens L6 and seventh lens L7 are bonded, typically with an adhesive, to configure cemented lenses. Seventh lens L7 and eighth lens L8 are bonded, typically with an adhesive, to configure cemented lenses.

Third lens group G3 includes, in order from the object side to the image side, tenth lens L10 having positive optical power and eleventh lens L11 having negative optical power. Tenth lens L10 and eleventh lens L11 are bonded, typically with an adhesive, to configure cemented lenses.

Fourth lens group G4 includes twelfth lens L12 having positive optical power, thirteenth lens L13 having negative optical power, and fourteenth lens L14 having positive optical power. Thirteenth lens L13 and fourteenth lens L14 are bonded, typically with an adhesive, to configure cemented lenses.

Fifth lens group G5 includes fifteenth lens L15 having positive optical power.

Each lens is described below.

Lenses in first lens group G1 are described. First lens L1 is a meniscus lens having a convex surface directed toward the object side. Second lens L2 is a meniscus lens having a convex surface directed toward the object side, and its surfaces are both aspheric. Third lens L3 is a biconcave lens. Fourth lens L4 is a meniscus lens having a convex surface directed toward the object side.

Lenses in second lens group G2 are described. Fifth lens L5 is a meniscus lens having a concave surface directed toward the object side, and its surfaces are both aspheric. Sixth lens L6 is a meniscus lens having a concave surface directed toward the object side. Seventh lens L7 is a biconcave lens. Eighth lens L8 is a biconvex lens. Ninth lens L9 is a biconvex lens.

Lenses in third lens group G3 are described. Tenth lens L10 is a biconvex lens. Eleventh lens L11 is a biconcave lens.

Lenses in fourth lens group G4 are described. Twelfth lens L12 is a biconvex lens, and its surfaces are both aspheric.

Thirteenth lens 113 is a biconcave lens. Fourteenth lens L14 is a meniscus lens having a convex surface directed toward the object side.

A lens in fifth lens group G5 is described. Fifteenth lens L15 is a biconvex lens, and its surfaces are both aspheric.

In the imaging optical system, first lens group G1 moves to the image surface side, second lens group G2 moves integrally with aperture stop A to the object side, third lens group G3 moves to the object side, fourth lens group G4 moves to the object side, and fifth lens group G5 does not move when zooming from the wide-angle end to the telephoto end on photographing. During zooming, each lens group moves along an optical axis such that a distance between first lens group G1 and second lens group G2 decreases, a distance between second lens group G2 and third lens group G3 increases, a distance between third lens group G3 and fourth lens group G4 decreases, a distance between fourth lens group G4 and fifth lens group G5 increases, and a distance between fifth lens group G5 and image surface S does not change.

As shown in FIG. 1, when zooming from the wide-angle end to the telephoto end, an aperture stop diameter of aperture stop A stays the same from the wide-angle end to an intermediate position, and becomes larger at the telephoto end, compared to that at the intermediate position.

In the optical imaging system, fourth lens group G4 moves along the optical axis to the image surface side when focusing from the infinity focusing state to the proximity focusing state.

Second Exemplary Embodiment

Figure 3:
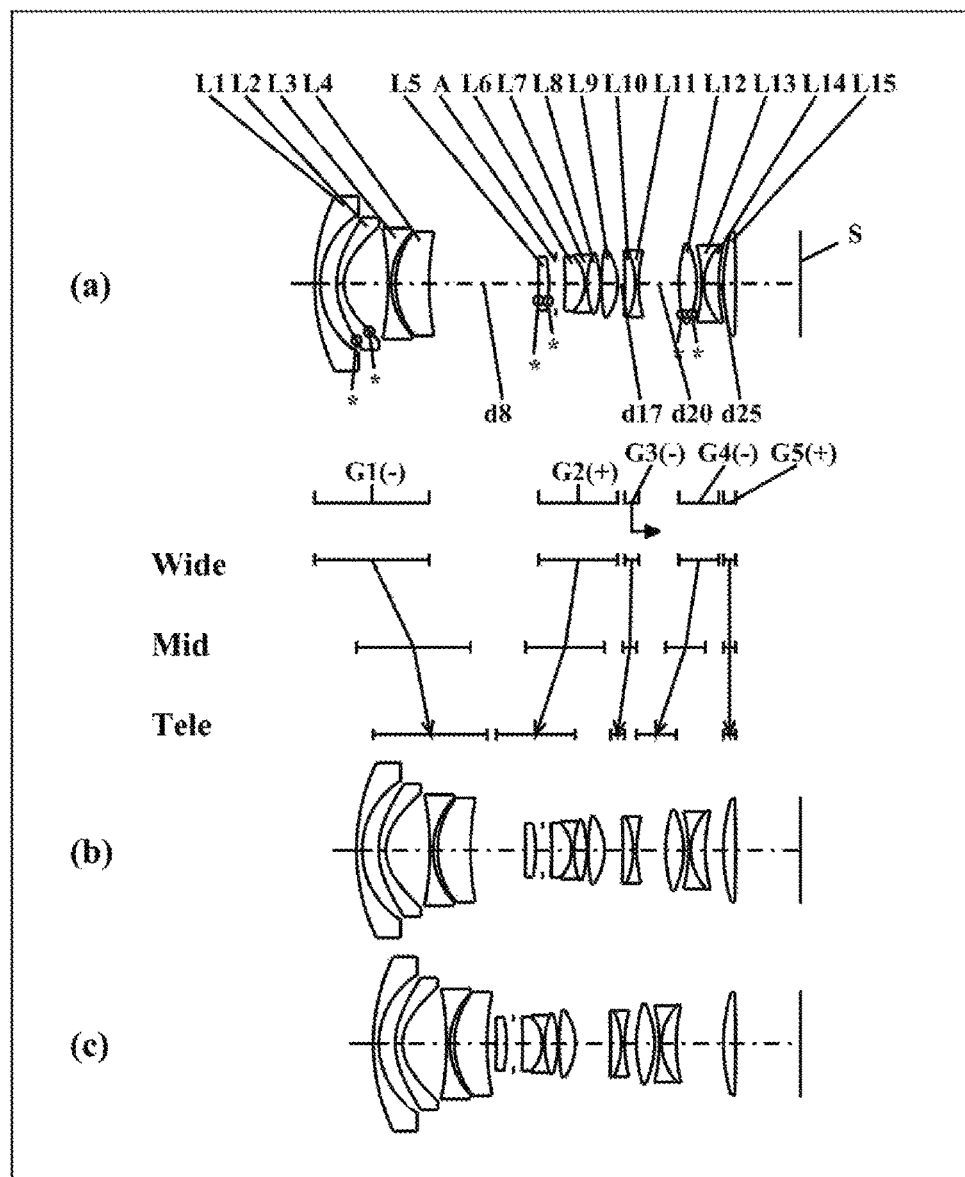
FIG. 3 is a lens layout diagram of an imaging optical system showing an infinity focusing state in accordance with a second exemplary embodiment (numerical practical example 2).

FIG. 3 is an imaging optical system in the second exemplary embodiment.

The imaging optical system includes, in order from the object side to the image side, first lens group G1 having negative optical power, second lens group G2 having positive optical power, third lens group G3 having negative optical power, fourth lens group G4 having negative optical power, and fifth lens group G5 having positive optical power.

First lens group G1 includes, in order from the object side to the image side, first lens L1 having negative optical power, second lens L2 having negative optical power, third lens L3 having negative optical power, and fourth lens L4 having positive optical power.

Second lens group G2 includes, in order from the object side to the image side, fifth lens L5 having positive optical power, aperture stop A, sixth lens L6 having positive optical power, seventh lens L7 having negative optical power, eighth lens L8 having positive optical power, and ninth lens L9 with positive optical power. Sixth lens L6 and seventh lens L7 are bonded, typically with an adhesive, to configure cemented lenses. Seventh lens L7 and eighth lens L8 are bonded, typically with an adhesive, to configure cemented lenses.

Third lens group G3 includes, in order from the object side to the image side, tenth lens L10 having positive optical power and eleventh lens L11 having negative optical power. Tenth lens L10 and eleventh lens L11 are bonded, typically with an adhesive, to configure cemented lenses.

Fourth lens group G4 includes twelfth lens L12 having positive optical power, thirteenth lens L13 having negative optical power, and fourteenth lens L14 having positive optical power. Thirteenth lens L13 and fourteenth lens L14 are bonded, typically with an adhesive, to configure cemented lenses.

Fifth lens group G5 includes fifteenth lens L15 having positive optical power.

Each lens is described.

Lenses in first lens group G1 are described. First lens L1 is a meniscus lens having a convex surface directed toward the object side. Second lens L2 is a meniscus lens having a convex surface directed toward the object side, and its surfaces are both aspheric. Third lens L3 is a biconcave lens. Fourth lens L4 is a meniscus lens having a convex surface directed toward the object side.

Lenses in second lens group G2 are described. Fifth lens L5 is a meniscus lens having a concave surface directed toward the object side, and its surfaces are both aspheric. Sixth lens L6 is a meniscus lens having a concave surface directed toward the object side. Seventh lens L7 is a biconcave lens. Eighth lens L8 is a biconvex lens. Ninth lens L9 is a biconvex lens.

Lenses in third lens group G3 are described. Tenth lens L10 is a meniscus lens having a concave surface directed toward the object side. Eleventh lens L11 is a biconcave lens.

Lenses in fourth lens group G4 are described. Twelfth lens L12 is a biconvex lens, and its surfaces are both aspheric. Thirteenth lens L13 is a biconcave lens. Fourteenth lens L14 is a meniscus lens having a convex surface directed toward the object side.

A lens in fifth lens group G5 is described. Fifteenth lens L15 is a biconvex lens.

In the imaging optical system, when zooming from the wide-angle end to the telephoto end on photographing, first lens group G1 moves to the image surface side, second lens group G2 moves integrally with aperture stop A to the object side, third lens group G3 moves to the object side, fourth lens group G4 moves to the object side, and fifth lens group G5 does not move. During zooming, each lens group moves along an optical axis such that a distance between first lens group G1 and second lens group G2 decreases, a distance between second lens group G2 and third lens group G3 increases, a distance between third lens group G3 and fourth lens group G4 decreases, a distance between fourth lens group G4 and fifth lens group G5 increases, and a distance between fifth lens group G5 and image surface S does not change.

As shown in FIG. 3, when zooming from the wide-angle end to the telephoto end, an aperture stop diameter of aperture stop A stays the same from the wide-angle end to the intermediate position, and becomes larger at the telephoto end, compared to that at the intermediate position.

In the optical imaging system, fourth lens group G4 moves along the optical axis to the image surface side when focusing from the infinity focusing state to the proximity focusing state.

Third Exemplary Embodiment

Figure 5:
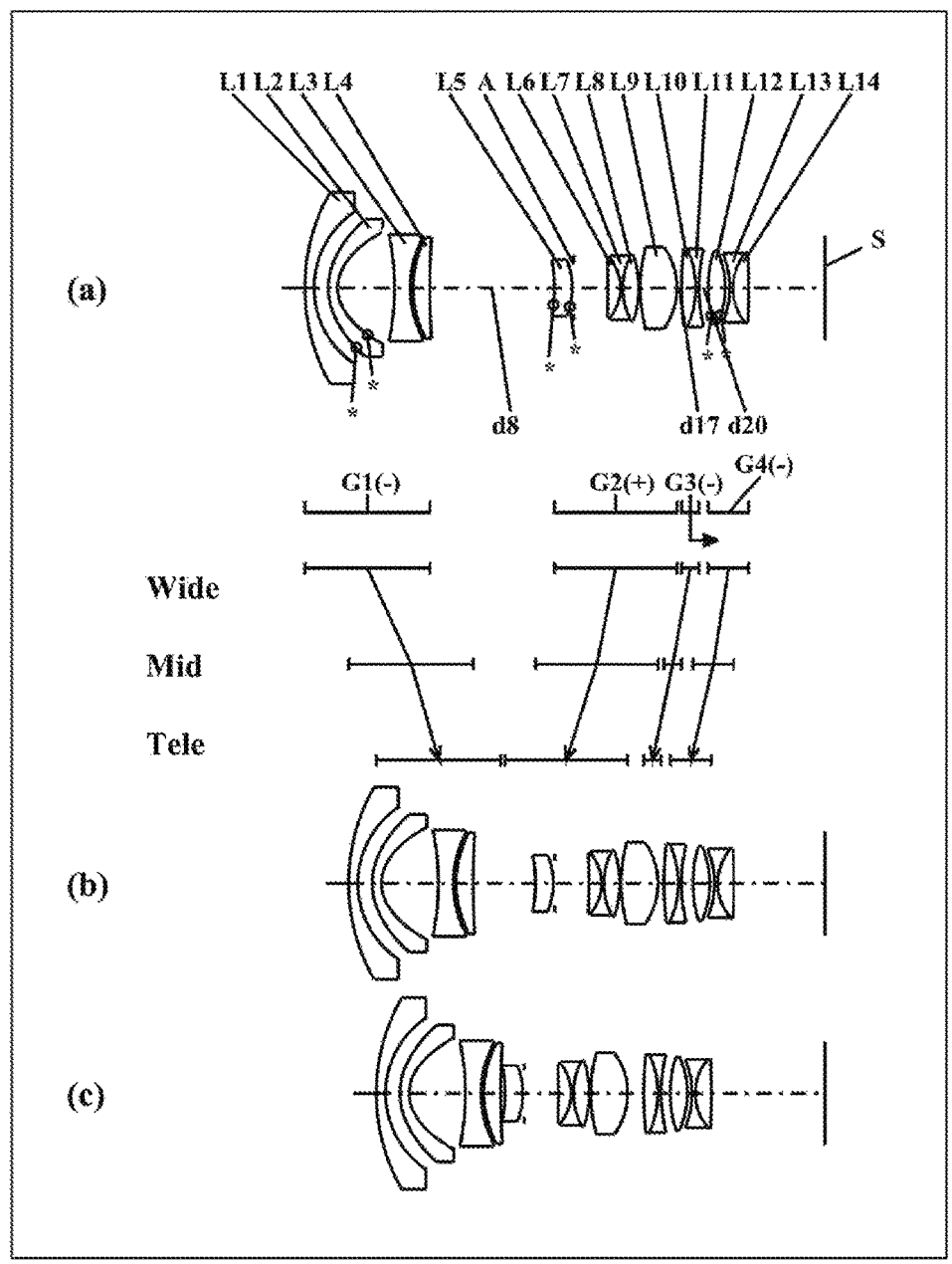
FIG. 5 is a lens layout diagram of an imaging optical system showing an infinity focusing state in accordance with a third exemplary embodiment (numerical practical example 3).
Figure 6:
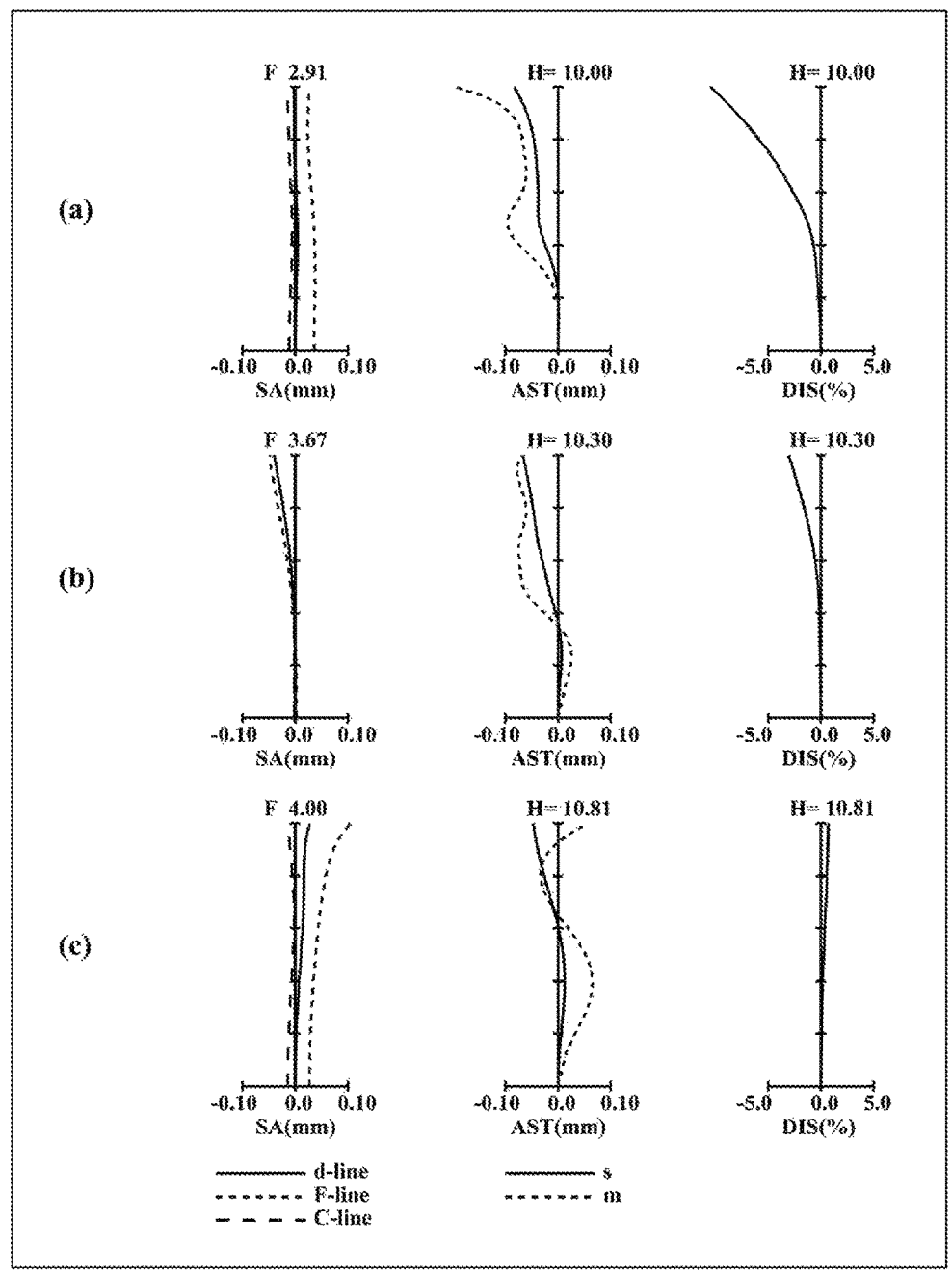
FIG. 6 is a longitudinal aberration diagram of the imaging optical system in the infinity focusing state in accordance with numerical practical example 3.

FIG. 5 is an imaging optical system in the third exemplary embodiment.

The imaging optical system includes, in order from the object side to the image side, first lens group G1 having negative optical power, second lens group G2 having positive optical power, third lens group G3 having negative optical power, and fourth lens group G4 having negative optical power.

First lens group G1 includes, in order from the object side to the image side, first lens L1 having negative optical power, second lens L2 having negative optical power, third lens L3 having negative optical power, and fourth lens L4 having positive optical power. Third lens L3 and fourth lens L4 are bonded, typically with an adhesive, to configure cemented lenses.

Second lens group G2 includes, in order from the object side to the image side, fifth lens L5 having positive optical power, aperture stop A, sixth lens L6 having positive optical power, seventh lens L7 having negative optical power, eighth lens L8 having positive optical power, and ninth lens L9 having positive optical power. Sixth lens L6 and seventh lens L7 are bonded, typically with an adhesive, to configure cemented lenses. Seventh lens L7 and eighth lens L8 are bonded, typically with an adhesive, to configure cemented lenses.

Third lens group G3 includes, in order from the object side to the image side, tenth lens L10 having positive optical power and eleventh lens L11 having negative optical power. Tenth lens L10 and eleventh lens L11 are bonded, typically with an adhesive, to configure cemented lenses.

Fourth lens group G4 includes twelfth lens L12 having positive optical power, thirteenth lens L13 having negative optical power, and fourteenth lens L14 having positive optical power. Thirteenth lens L13 and fourteenth lens L14 are bonded, typically with an adhesive, to configure cemented lenses.

Each lens is described.

Lenses in first lens group G1 are described. First lens L1 is a meniscus lens having a convex surface directed toward the object side. Second lens L2 is a meniscus lens having a convex surface directed toward the object side, and its surfaces are both aspheric. Third lens L3 is a biconcave lens. Fourth lens L4 is a meniscus lens having a convex surface directed toward the object side.

Lenses in second lens group G2 are described. Fifth lens L5 is a meniscus lens having a concave surface directed toward the object side, and its surfaces are both aspheric. Sixth lens L6 is a meniscus lens having a concave surface directed toward the object side. Seventh lens L7 is a biconcave lens. Eighth lens L8 is a biconvex lens. Ninth lens L9 is a biconvex lens.

Lenses in third lens group G3 are described. Tenth lens L10 is a biconvex lens. Eleventh lens L11 is a biconcave lens.

Lenses in fourth lens group G4 are described. Twelfth lens L12 is a biconvex lens, and its surfaces are both aspheric. Thirteenth lens L13 is a biconcave lens. Fourteenth lens L14 is a biconvex lens.

In the imaging optical system, when zooming from the wide-angle end to the telephoto end on photographing, first lens group G1 moves to the image surface side, second lens group G2 moves integrally with aperture stop A to the object side, third lens group G3 moves to the object side, and fourth lens group G4 moves to the object side. During zooming, each lens group moves along an optical axis such that a distance between first lens group G1 and second lens group G2 decreases, a distance between second lens group G2 and third lens group G3 increases, a distance between third lens group G3 and fourth lens group G4 decreases, and a distance between fourth lens group G4 and image surface A increases from the wide-angle end to the intermediate position and decreases from the intermediate position to the telephoto end.

As shown in FIG. 5, when zooming from the wide-angle end to the telephoto end, an aperture stop diameter of aperture stop A stays the same from the wide-angle end to the intermediate position, and becomes larger at the telephoto end, compared to that at the intermediate position.

In the imaging optical system, fourth lens group G4 moves along the optical axis to the image surface side when focusing from the infinity focusing state to the proximity focusing state.

Fourth Exemplary Embodiment

Figure 7:
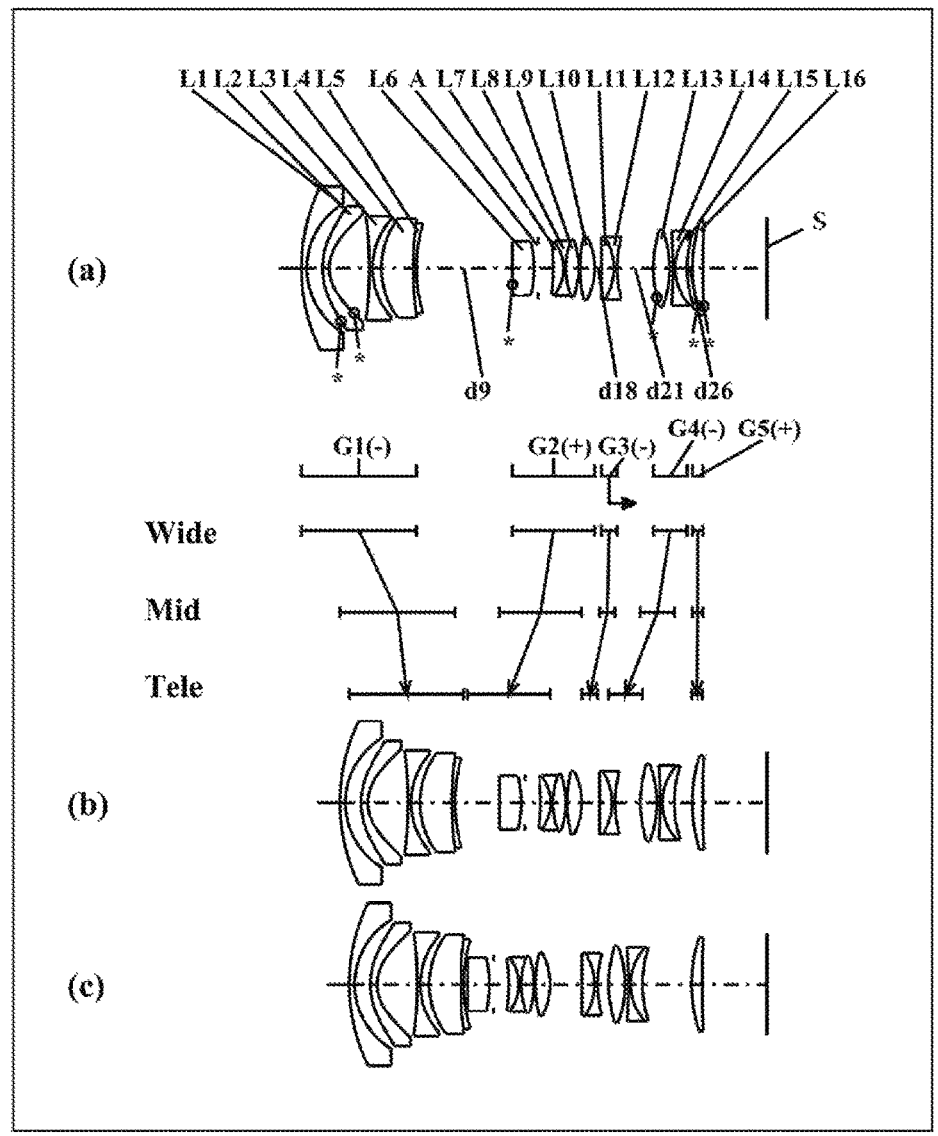
FIG. 7 is a lens layout diagram of an imaging optical system showing an infinity focusing state in accordance with a fourth exemplary embodiment (numerical practical example 4).
Figure 8:
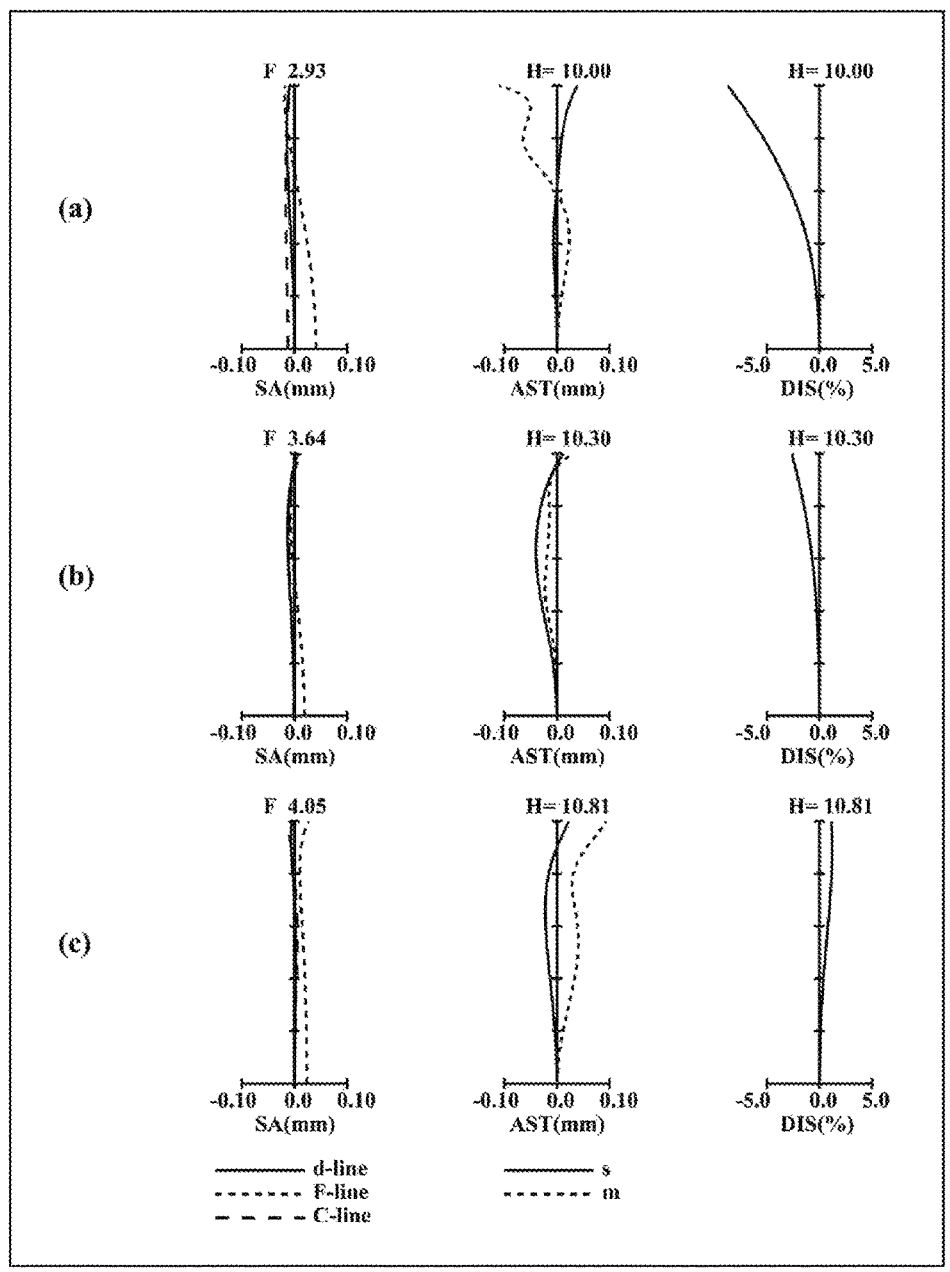
FIG. 8 is a longitudinal aberration diagram of the imaging optical system in the infinity focusing state in accordance with numerical practical example 4.

FIG. 7 is an imaging optical system in the fourth exemplary embodiment.

The imaging optical system includes, in order from the object side to the image side, first lens group G1 having negative optical power, second lens group G2 having positive optical power, third lens group G3 having negative optical power, fourth lens group G4 having negative optical power, and fifth lens group G5 having positive optical power.

First lens group G1 includes, in order from the object side to the image side, first lens L1 having negative optical power, second lens L2 having negative optical power, third lens L3 having negative optical power, fourth lens L4 having positive optical power, and fifth lens L5 having negative optical power. Fourth lens L4 and fifth lens L5 are bonded, typically with an adhesive, to configure cemented lenses.

Second lens group G2 includes, in order from the object side to the image side, sixth lens L6 having positive optical power, aperture stop A, seventh lens L7 having positive optical power, eighth lens L8 having negative optical power, ninth lens L9 having positive optical power, and tenth lens L10 having positive optical power. Seventh lens L7 and eighth lens L8 are bonded, typically with an adhesive, to configure cemented lenses. Eighth lens L8 and ninth lens L9 are bonded, typically with an adhesive, to configure cemented lenses.

Third lens group G3 includes, in order from the object side to the image side, eleventh lens L11 having positive optical power and twelfth lens L12 having negative optical power. Eleventh lens L11 and twelfth lens L12 are bonded, typically with an adhesive, to configure cemented lenses.

Fourth lens group G4 includes thirteenth lens L13 having positive optical power, fourteenth lens L14 having negative optical power, and fifteenth lens L15 having positive optical power. Fourteenth lens L14 and fifteenth lens L15 are bonded, typically with an adhesive, to configure cemented lenses.

Fifth lens group G5 includes sixteenth lens L16 having positive optical power.

Each lens is described.

Lenses in first lens group G1 are described. First lens L1 is a meniscus lens having a convex surface directed toward the object side. Second lens L2 is a meniscus lens having a convex surface directed toward the object side, and its surfaces are both aspheric. Third lens L3 is a biconcave lens. Fourth lens L4 is a meniscus lens having a convex surface directed toward the object side. Fifth lens L5 is a meniscus lens having a convex surface directed toward the object side.

Lenses in second lens group G2 are described. Sixth lens L6 is a biconvex lens, and its surface directed toward the object side is aspheric. Seventh lens L7 is a meniscus lens having a concave surface directed toward the object side. Eighth lens L8 is a biconcave lens. Ninth lens L9 is a biconvex lens. Tenth lens L10 is a biconvex lens.

Lenses in third lens group G3 are described. Eleventh lens L11 is a meniscus lens having a concave surface directed toward the object side. Twelfth lens L12 is a biconcave lens.

Lenses in fourth lens group G4 are described. Thirteenth lens L13 is a biconvex lens, and its surface directed toward the object side is aspheric. Fourteenth lens L14 is a biconcave lens. Fifteenth lens L15 is a meniscus lens having a convex surface directed toward the object side.

A lens in fifth lens group G5 is described. Sixteenth lens L16 is a meniscus lens having a convex surface directed toward the object side, and its surfaces are both aspheric.

In the imaging optical system, when zooming from the wide-angle end to the telephoto end on photographing, first lens group G1 moves to the image surface side, second lens group G2 moves integrally with aperture stop A to the object side, third lens group G3 moves to the object side, fourth lens group G4 moves to the object side, and fifth lens group G5 does not move. During zooming, each lens group moves along an optical axis such that a distance between first lens group G1 and second lens group G2 decreases, a distance between second lens group G2 and third lens group G3 increases, a distance between third lens group G3 and fourth lens group G4 decreases, a distance between fourth lens group G4 and fifth lens group G5 increases, and a distance between fifth lens group G5 and image surface S does not change.

As shown in FIG. 7, when zooming from the wide-angle end to the telephoto end, an aperture stop diameter of aperture stop A stays the same from the wide-angle end to the intermediate position, and becomes larger at the telephoto end, compared to that at the intermediate position.

In the imaging optical system, fourth lens group G4 moves along the optical axis to the image surface side when focusing from the infinity focusing state to the proximity focusing state.

Conditions and Advantages

Hereinafter, conditions that the imaging optical systems in the first to fourth exemplary embodiments, for example, can satisfy are described. Multiple feasible conditions are specified for the imaging optical systems in the first to fourth exemplary embodiments. A configuration of an imaging optical system that satisfies all these multiple conditions has the greatest advantage. However, by satisfying an individual condition, an imaging optical system that provides a corresponding advantage may be achieved.

The imaging optical system of the present disclosure, typically the imaging optical systems in the first to fourth exemplary embodiments, includes in order from the object side to the image side, first lens group G1 having negative optical power, second lens group G2 having positive optical power, third lens group G3 having negative optical power, and fourth lens group G4 having negative optical power. When zooming from the wide-angle end to the telephoto end on photographing, each distance between the lens groups changes. This enables fourth lens group G4 to effectively cancel aberration caused by first lens group G1, in particular, field curvature aberration at the wide-angle end. Accordingly, fourth lens group G4 can cancel aberration caused by first lens group G1, while downsizing first lens group G1 by setting a strong optical power to first lens group G1.

Still more, a lens disposed closest to the object side in second lens group G2 has a concave surface directed toward the object side. This can reduce average refraction angle of luminous flux entering second lens group G2. Accordingly, high-order spherical aberration and coma aberration can be suppressed, in particular, at the wide-angle end.

Still more, a lens disposed closest to the object side in fourth lens group G4 has positive optical power. This allows satisfactory correction of spherical aberration, coma aberration, and field curvature over the entire zoom range.

Furthermore, for example, the imaging optical system preferably satisfies condition (1) below.

$$0.01 < fG1/fG4 < 0.7 \quad (1)$$

Where fG1: Focal length of first lens group G1 fG4: Focal length of fourth lens group G4

Condition (1) is a condition that specifies a relation between the focal length of first lens group G1 and the focal length of fourth lens group G4. A value lower than a lower limit of condition (1) makes it difficult to offset aberrations in first lens group G1 with fourth lens group G4, and thus correction of field curvature becomes difficult. Conversely, a value higher than an upper limit of condition (1) causes too large spherical aberration and field curvature in fourth lens group G4, and thus a picture quality degrades.

Preferably, the aforementioned advantage can be further enhanced by satisfying one of conditions (1a) and (1b) below.

$$0.02 < fG1/fG4 \tag{1a}$$

$$fG1/fG4 < 0.4 \tag{1b}$$

More preferably, the aforementioned advantage can be further enhanced by satisfying one of conditions (1c) and (1d).

$$0.05 < fG1/fG4 \tag{1c}$$

$$fG1/fG4 < 0.2 \tag{1d}$$

Still more, for example, the imaging optical system preferably includes at least a set of cemented lenses of a lens having positive optical power and a lens having negative optical power in aforementioned first lens group G1, and satisfies condition (2) below.

$$1.4 < N1n < 1.65 \tag{2}$$

Where $N1n$: Refractive index to the d-line of the lens having negative optical power that constitutes the cemented lenses Condition (2) is a condition that specifies a refractive index to the d-line of the lens having negative optical power that constitutes the cemented lenses. A value lower than a lower limit of condition (2) results in a too large absolute value of Petzval sum, and thus correction of field curvature becomes difficult. Conversely, a value higher than an upper limit of condition (2) requires the use of a high dispersion material for the lens having negative optical power that constitutes the cemented lenses, and thus correction of color aberration becomes difficult.

Preferably, the aforementioned advantage can be further enhanced by satisfying one of conditions (2a) and (2b) below.

$$1.47 < N1n \tag{2a}$$

$$N1n < 1.61 \tag{2b}$$

More preferably, the aforementioned advantage can be further enhanced by satisfying one of conditions (2c) and (2d) below.

$$1.52 < N1n \tag{2c}$$

$$N1n < 1.58 \tag{2d}$$

Still more, for example, the imaging optical system preferably includes at least a set of cemented lenses of a lens having positive optical power and a lens having negative optical power in aforementioned first lens group G1, and satisfies condition (3) below.

$$60 < v1n < 100 \tag{3}$$

Where $v1n$: Abbe number to the d-line of the lens having negative optical power that constitutes the cemented lenses Condition (3) is a condition that specifies the Abbe number to the d-line of the lens having negative optical power that constitutes the cemented lenses. A value lower than a lower limit of condition (3) makes it difficult to correct magnification chromatic aberration. Conversely, a value higher than an upper limit of condition (3) requires the use of a material with low refractive index for the lens having negative optical power that constitutes the cemented lenses, and thus correction of field curvature becomes difficult.

Preferably, the aforementioned advantage can be further enhanced by satisfying one of conditions (3a) and (3b) below.

$$65 < v1n \tag{3a}$$

$$v1n < 90 \tag{3b}$$

More preferably, the aforementioned advantage can be further enhanced by satisfying one of conditions (3c) and (3d) below.

$$70 < v1n \tag{3c}$$

$$v1n < 80 \tag{3d}$$

Still more, the imaging optical system, for example, preferably includes cemented lenses of, in order from the object side to the image side of second lens group G2, a lens having positive optical power, a lens having negative optical power, and a lens having positive optical power. The use of cemented lenses enables to reduce variations in spherical aberration and field aberration due to a manufacturing error in lens space.

Still more, for example, the imaging optical system preferably includes at least one negative lens in second lens group G2, and satisfies condition (4) below.

$$1.85 < N2n \tag{4}$$

Where $N2n$: Refractive index to the d-line of the negative lens in second lens group G2

Condition (4) is a condition that specifies refractive index to the d-line of the negative lens in second lens group G2. A value lower than a lower limit of condition (4) makes it difficult to correct spherical aberration and field curvature.

Preferably, the aforementioned advantage can be further enhanced by satisfying condition (4a) below.

$$1.90 < N2n \tag{4a}$$

More preferably, the aforementioned advantage can be further enhanced by satisfying condition (4b) below.

$$1.95 < N2n \tag{4b}$$

Still more, for example, the imaging optical system preferably includes at least one positive lens in third lens group G3, and satisfies condition (5) below.

$$14 < v3p < 35 \tag{5}$$

Where $v3p$: Abbe number to the d-line of a positive lens in third lens group G3 Condition (5) is a condition that specifies the Abbe number to the d-line of the positive lens that constitutes third lens group G3. A value lower than a lower limit of condition (5) makes it difficult to correct axial chromatic aberration and magnification chromatic aberration. Conversely, a value higher than an upper limit of condition (5)

makes it difficult to correct axial chromatic aberration and magnification chromatic aberration.

Preferably, the aforementioned advantage can be further enhanced by satisfying one of conditions (5a) and (5b) below.

$$16 < v3p \tag{5a}$$

$$v3p < 25 \tag{5b}$$

More preferably, the aforementioned advantage can be further enhanced by satisfying at least one of conditions (5c) and (5d) below.

$$17 < v3p \tag{5c}$$

$$v3p < 20 \tag{5d}$$

Schematic Diagram of Imaging Apparatus Employing the First Exemplary Embodiment

Figure 9:
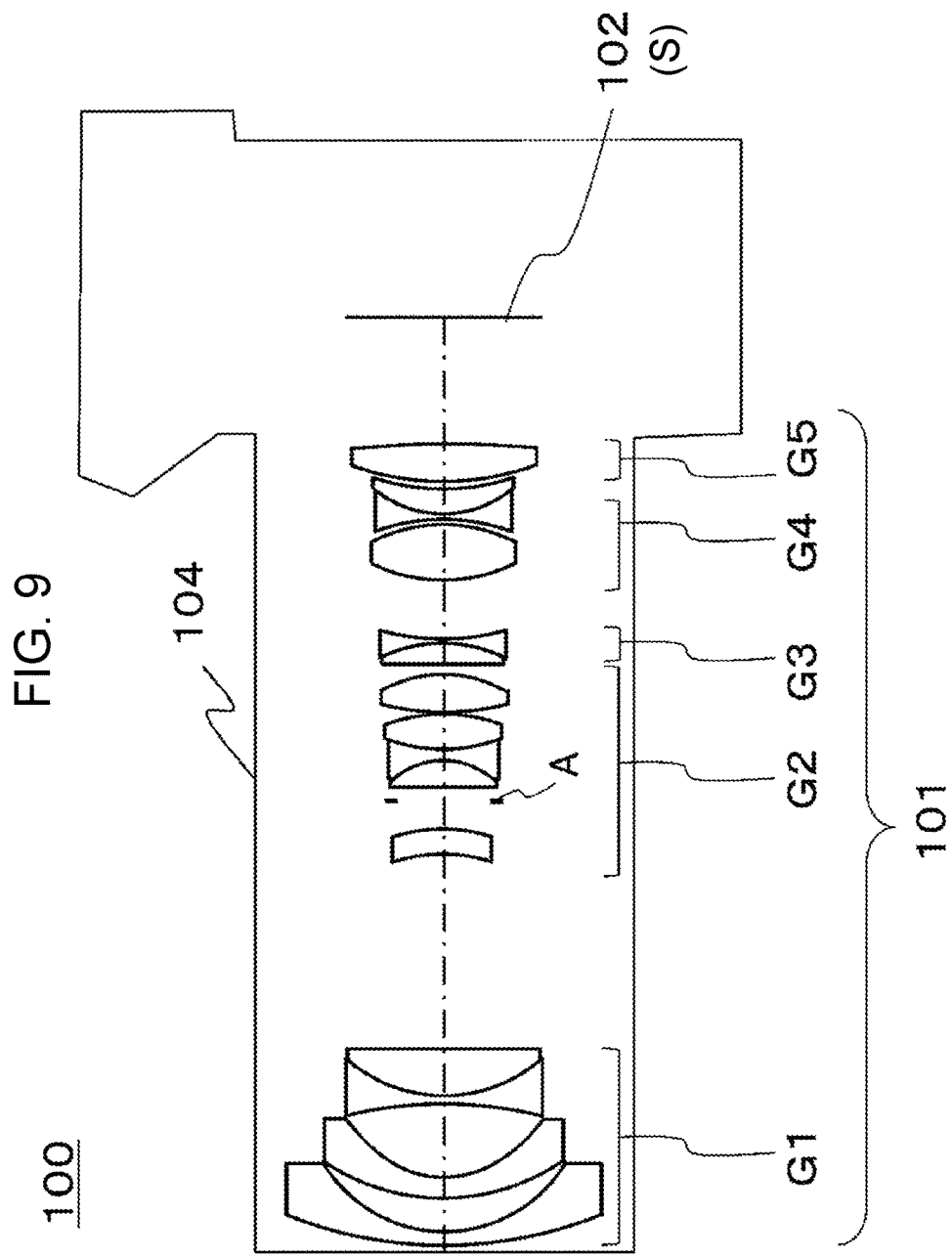
FIG. 9 is a schematic block diagram of a digital camera in accordance with the first exemplary embodiment.

FIG. 9 is a schematic diagram of the imaging apparatus employing the imaging optical system in the first exemplary embodiment. The imaging optical systems in the second, third, and fourth exemplary embodiments are also applicable to the imaging apparatus.

Imaging apparatus 100 includes casing 104, image sensor 102, and imaging optical system 101. A specific example of imaging apparatus 100 is a digital camera.

Imaging optical system 101 includes first lens group G1, second lens group G2, third lens group G3, fourth lens group G4, and fifth lens group G5.

Second lens group G2 includes aperture stop A.

Casing 104 holds each lens group of imaging optical system 101 and aperture stop A.

Image sensor 102 is disposed at a position of image surface S in the imaging optical system in the first exemplary embodiment.

Imaging optical system 101 includes an actuator and lens frame in casing 104 for moving first lens group G1, second lens group G2, third lens group G3, and fourth lens group G when zooming.

This achieves an imaging apparatus that can satisfactorily correct aberrations.

An example of applying the aforementioned imaging optical system in the first exemplary embodiment to a digital camera is given here. However, the imaging optical system is also applicable to other devices, such as monitoring cameras and smartphones.

Schematic Diagram of Camera System Employing the First Exemplary Embodiment

Figure 10:
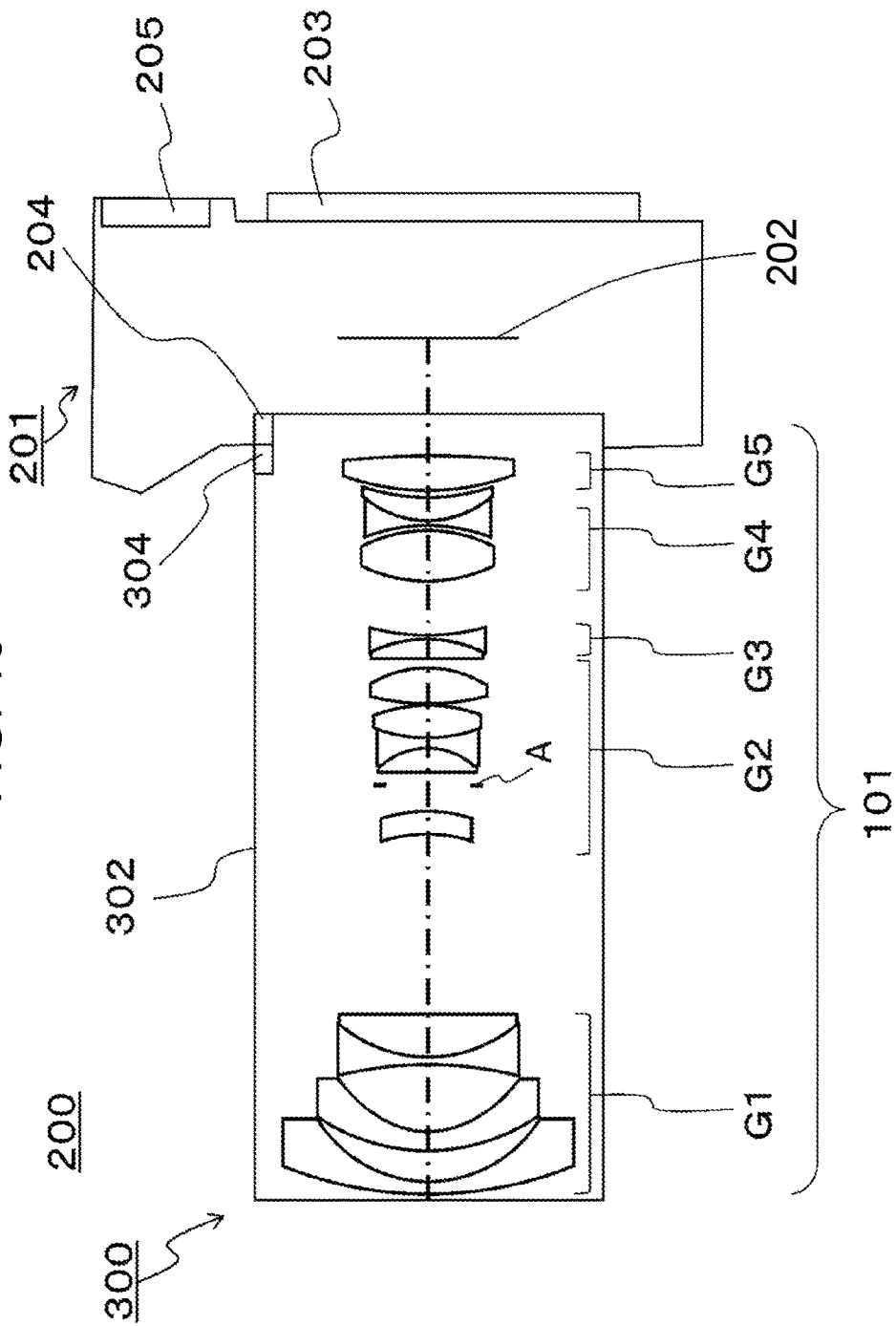
FIG. 10 is a schematic block diagram of a lens interchangeable digital camera system in accordance with the first exemplary embodiment.

FIG. 10 is a schematic diagram of the camera system employing the imaging optical system in the first exemplary embodiment. The imaging optical systems in the second, third, and fourth exemplary embodiments are also applicable to the camera system.

Camera system 200 includes camera body 201 and interchangeable lens device 300 detachably connected to camera body 201.

Camera body 201 includes image sensor 202 for receiving an optical image formed by the imaging optical system of interchangeable lens device 300 and converting the optical image to an electric image signal, monitor 203 for displaying the image signal converted by image sensor 202, a memory (not illustrated) for storing the image signal, camera mount 204, and finder 205.

Interchangeable lens device 300 includes first lens group G1, second lens group G2, third lens group G3, fourth lens group G4, and fifth lens group G5.

Second lens group G2 includes aperture stop A.

Lens barrel 302 holds each lens group of imaging optical system 101 and aperture stop A, and includes lens mount 304 connected to camera mount 204 of camera body 201.

Camera mount 204 and lens mount 304 electrically connect a controller (not illustrated) inside camera body 201 and a controller (not illustrated) inside interchangeable lens device 300, in addition to physical connection, so as to function as an interface that allows mutual signal communication.

Imaging optical system 101 includes each lens group held by lens barrel 302 and camera body 201. Imaging optical system 101 also includes an actuator controlled by the controller inside interchangeable lens device 300, so as to move first lens group G1, second lens group G2, third lens group G3, and fourth lens group G1; and a lens frame.

Other Exemplary Embodiments

The first to fourth exemplary embodiments are described above to exemplify the technology disclosed in the present disclosure. The technology of the present disclosure, however, is not limited to these embodiments, but is applicable to other embodiments appropriately devised through modification, substitution, addition, omission, and so on.

The imaging optical systems in the first to fourth exemplary embodiments do not need to use the entire zooming range. In other words, the imaging optical systems may be used as an imaging optical system with magnification lower than that of the imaging optical systems described in numerical practical examples 1 to 4 described later by segmenting a range in which optical performance is ensured, depending on a desired zooming range. Still more, a focal length in which optical performance is ensured may be segmented, depending on a desired zooming position, to use as an imaging optical system with short focus.

Each lens group configuring the imaging optical systems in the first to fourth exemplary embodiments is configured only with refractive lenses that deflect incident light ray by refraction (i.e., a type of lens in which deflection takes place on a boundary face of mediums with different refractive indexes). However, lens groups are not limited to this type. For example, each lens group may be configured with diffractive lenses that deflect incident light ray by diffraction, hybrid lenses of refraction and diffraction that deflect incident light ray by combination of diffraction and refraction, or distributed index lenses that deflect incident light ray based on distribution of refractive indexes. In particular, the hybrid lenses of refraction and diffraction are preferable for reducing wavelength dependency of diffraction efficiency by forming a diffraction structure in a boundary face of mediums with different refractive indexes.

Accordingly, a camera with good aberrations can be achieved.

NUMERICAL PRACTICAL EXAMPLES

Numerical practical examples to which the imaging optical systems in the first to fourth exemplary embodiments are specifically applied are given below. In all numerical practical examples, the unit of length is mm, and the unit of angle of view is ° in all the tables. In addition, in all the numerical practical examples, r is a curvature radius; d, a surface distance; nd, a refractive index to the d-line; and vd, an Abbe number to the d-line. Still more, in all the numerical practical examples, a surface with an * mark is aspheric and its aspheric shape is defined by the following expression.

Furthermore, in all the numerical practical examples, an aperture stop diameter is a valid aperture stop diameter at each zoom position.

$$Z = \frac{h^2/r}{1+\sqrt{1-(1+\kappa)(h/r)^2}} + \Sigma A_n h^n$$

Where

Z: Distance from a point on an aspheric surface with height h from the optical axis to the tangent plane at the apex of the aspheric surface h: Height from the optical axis
r: Curvature radius at the apex
κ: Conic constant
An: n-degree aspherical coefficient FIG. 2, FIG. 4, FIG. 6, and FIG. 8 are longitudinal aberration diagrams of the imaging optical systems in the infinity focusing state in accordance with the first to fourth exemplary embodiments.

In each longitudinal aberration diagram, part (a) shows aberration at the wide-angle end; part (b), at the intermediate position; and part (c), at the telephoto end. Each longitudinal aberration diagram shows, in order from the left, spherical aberration (SA (mm)), astigmatism (AST (mm)), and distortion aberration (DIS (%)). In a spherical aberration diagram, the vertical axis represents F number (shown by F in the diagram). A solid line represents the characteristics of d-line; a short broken line, of F-line; and a long broken line, of C-line. In an astigmatism diagram, the vertical axis represents the image height (shown by H in the diagram). A solid line represents the characteristics of the sagittal plane (shown by s in the diagram); and a broken line, of the meridional plane (shown by m in the diagram). In a distortion aberration diagram, the vertical axis represents the image height (shown by H in the diagram).

Numerical Practical Example 1

The imaging optical system in numerical practical example 1 corresponds to the first exemplary embodiment shown in FIG. 1. Table 1 shows surface data and Table 2 shows aspheric surface data of the imaging optical system in numerical practical example 1. Table 3A to Table 3D show various data in the infinity focusing state.

TABLE 1

(Surface Data)

| Surface No. | r | d | nd | vd |
|---|---|---|---|---|
| Object surface | ∞ | | | |
| 1 | 47.28710 | 1.50000 | 1.80420 | 46.5 |
| 2 | 16.13360 | 3.93880 | | |
| 3* | 20.00000 | 2.20000 | 1.58699 | 59.5 |
| 4* | 9.12900 | 8.36750 | | |
| 5 | −54.56600 | 1.00000 | 1.55032 | 75.5 |
| 6 | 16.19180 | 4.80000 | 1.83481 | 42.7 |
| 7 | 169.01480 | Variable | | |
| 8* | −23.06100 | 2.85000 | 1.58699 | 59.5 |
| 9* | −14.42600 | 3.10660 | | |
| 10 (aperture) | ∞ | 1.66360 | | |
| 11 | −486.47650 | 2.89000 | 1.84666 | 23.8 |
| 12 | −9.13890 | 1.23850 | 2.00100 | 29.1 |
| 13 | 15.32360 | 4.15000 | 1.65412 | 39.7 |
| 14 | −20.58050 | 0.30000 | | |
| 15 | 32.45100 | 4.15830 | 1.49700 | 81.6 |
| 16 | −14.57700 | Variable | | |

TABLE 1-continued (Surface Data)

| Surface No. | r | d | nd | vd |
|---|---|---|---|---|
| 17 | 459.51960 | 2.31200 | 1.94595 | 18.0 |
| 18 | −18.56080 | 0.50000 | 1.84666 | 23.8 |
| 19 | 22.95650 | Variable | | |
| 20* | 18.69500 | 6.23000 | 1.49700 | 81.5 |
| 21* | −15.91900 | 0.49950 | | |
| 22 | −23.76950 | 0.70000 | 1.80610 | 33.3 |
| 23 | 11.86850 | 2.91000 | 1.62041 | 60.3 |
| 24 | 27.78360 | Variable | | |
| 25* | 38.85000 | 4.19000 | 1.68893 | 31.1 |
| 26* | −82.33400 | BF | | |
| Image surface | ∞ | | | |

TABLE 2

(Aspheric Surface Data)

3rd surface

K = −1.05646E+00, A4 = 1.80845E−05, A6 = −8.08328E−07,
A8 = 7.06416E−09 A10 = −2.77284E−11, A12 = 4.27081E−14,
A14 = 0.00000E+00
4th surface K = −5.25385E−01, A4 = −4.82252E−05, A6 = −1.81753E−06,
A8 = 1.39930E−08 A10 = −5.48449E−11, A12 = −3.85433E−25,
A14 = 0.00000E+00
8th surface K = 1.00000E+01, A4 = −7.26578E−05, A6 = 2.10308E−06,
A8 = 5.12892E−09 A10 = 1.08723E−09, A12 = 2.73560E−28,
A14 = 0.00000E+00
9th surface K = 3.86971E−01, A4 = −2.38905E−05, A6 = 9.02331E−07,
A8 = 3.54795E−09 A10 = 2.42127E−10, A12 = 1.36731E−27,
A14 = 0.00000E+00
20th surface K = −9.59638E−03, A4 = −1.07465E−05, A6 = −9.96899E−08,
A8 = 2.16846E−09 A10 = −3.81151E−11, A12 = −2.77388E−24,
A14 = 0.00000E+00
21st surface K = −3.44812E−01, A4 = 7.32993E−05, A6 = −2.76039E−07,
A8 = 2.87734E−09 A10 = −3.77924E−11, A12 = −3.51797E−26,
A14 = 0.00000E+00
25th surface K = −4.95556E+00, A4 = 3.50432E−05, A6 = 1.14639E−07,
A8 = −7.59685E−10 A10 = −4.78542E−12, A12 = −2.89187E−25,
A14 = −1.27904E−27
26th surface K = 9.46636E+00, A4 = 4.34406E−05, A6 = 1.11655E−07,
A8 = −4.89866E−10 A10 = −8.06050E−12, A12 = 3.73554E−24,
A14 = −1.80990E−27

(Various Data in Infinity Focusing State)

TABLE 3A (Various Data)
Zoom ratio 2.08563

| | Wide angle | Intermediate | Telephoto |
|---|---|---|---|
| Focal length | 8.2678 | 11.6445 | 17.2434 |
| F number | 2.90468 | 3.56972 | 3.98898 |
| Angle of view | 53.1986 | 42.7157 | 32.0045 |
| Image height | 10.0000 | 10.3000 | 10.8150 |
| Total lens length | 105.5316 | 97.2160 | 95.4838 |
| BF | 14.1608 | 14.1558 | 14.1467 |

TABLE 3A-continued (Various Data)
Zoom ratio 2.08563

| | Wide angle | Intermediate | Telephoto |
|---|---|---|---|
| d7 | 22.8204 | 10.6305 | 1.5141 |
| d16 | 1.3000 | 3.3512 | 5.8971 |
| d19 | 6.8084 | 4.7573 | 2.2116 |
| d24 | 0.9372 | 4.8164 | 12.2095 |
| Entrance pupil position | 14.8024 | 13.6938 | 12.3587 |
| Exit pupil position | −37.2160 | −51.1483 | −105.3546 |
| Front principal point | 21.7397 | 23.2619 | 27.1140 |
| Rear principal point | 97.2639 | 85.5715 | 78.2403 |

TABLE 3B (Data of Single Lens)

| Lens | First surface | Focal length |
|---|---|---|
| 1 | 1 | −31.1190 |
| 2 | 3 | −30.9275 |
| 3 | 5 | −22.5764 |
| 4 | 6 | 21.1486 |
| 5 | 8 | 58.4940 |
| 6 | 11 | 10.9702 |
| 7 | 12 | −5.5777 |
| 8 | 13 | 14.0713 |
| 9 | 15 | 20.8509 |
| 10 | 17 | 18.9041 |
| 11 | 18 | −12.0551 |
| 12 | 20 | 18.3989 |
| 13 | 22 | −9.7347 |
| 14 | 23 | 31.2112 |
| 15 | 25 | 38.8614 |

TABLE 3C (Data of Zoom Lens Groups)

| Group | First surface | Focal length | Lens configuration length | Front principal point | Rear principal point |
|---|---|---|---|---|---|
| 1 | 1 | −15.00425 | 21.80630 | 3.80257 | 8.12143 |
| 2 | 8 | 17.69510 | 20.35700 | 13.40652 | 18.98155 |
| 3 | 17 | −34.10326 | 2.81200 | 1.61603 | 2.96369 |
| 4 | 20 | −147.25216 | 10.33950 | 38.26587 | 35.17486 |
| 5 | 25 | 38.86136 | 4.19000 | 0.80671 | 2.48036 |

TABLE 3D (Magnification of Zoom Lens Groups)

| Group | First surface | Wide angle | Intermediate | Telephoto |
|---|---|---|---|---|
| 1 | 1 | 0.00000 | 0.00000 | 0.00000 |
| 2 | 8 | −0.37473 | −0.50513 | −0.68282 |
| 3 | 17 | 2.42405 | 2.46900 | 2.58082 |
| 4 | 20 | 1.02536 | 1.05161 | 1.10164 |
| 5 | 25 | 0.59161 | 0.59174 | 0.59198 |

Numerical Practical Example 2

Figure 4:
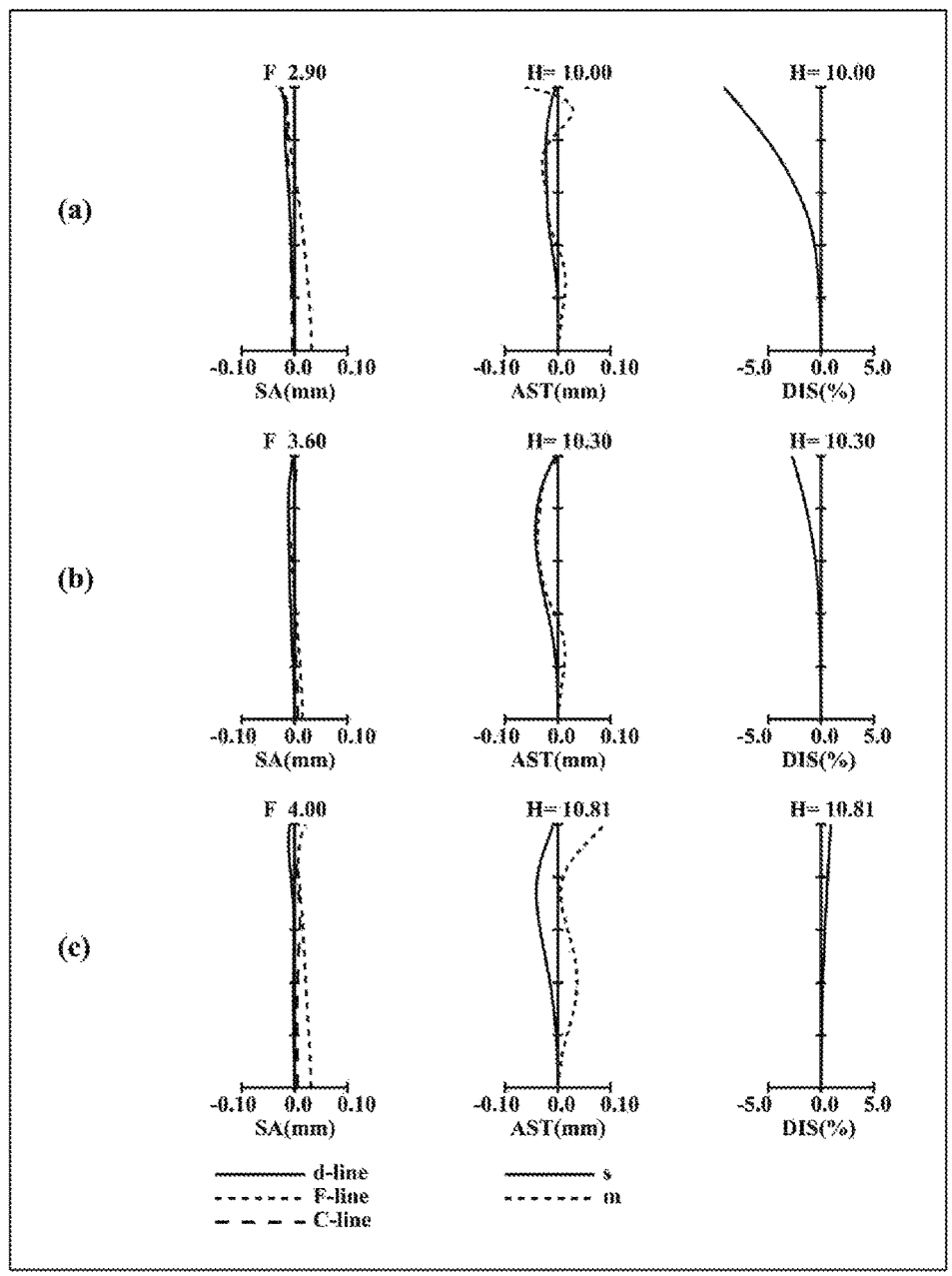
FIG. 4 is a longitudinal aberration diagram of the imaging optical system in the infinity focusing state in accordance with numerical practical example 2.

The imaging optical system in numerical practical example 2 corresponds to the second exemplary embodiment shown in FIG. 4. Table 4 shows surface data and Table 5 shows aspheric surface data of the imaging optical system in numerical practical example 2. Table 6A to Table 6D show various data in the infinity focusing state.

TABLE 4

(Surface Data)

| Surface No. | r | d | nd | vd |
|---|---|---|---|---|
| Object surface | ∞ | | | |
| 1 | 42.32190 | 1.20000 | 1.80610 | 33.3 |
| 2 | 17.34710 | 3.46470 | | |
| 3* | 15.88720 | 1.50000 | 1.66955 | 55.4 |
| 4* | 9.16970 | 9.28300 | | |
| 5 | −60.12490 | 0.70000 | 1.49700 | 81.6 |
| 6 | 15.70730 | 0.92840 | | |
| 7 | 17.41000 | 7.00000 | 1.83400 | 37.3 |
| 8 | 54.04060 | Variable | | |
| 9* | −92.81770 | 2.15790 | 1.80998 | 40.9 |
| 10* | −24.05780 | 1.44310 | | |
| 11 (aperture) | ∞ | 1.93040 | | |
| 12 | −100.33120 | 4.15130 | 1.84666 | 23.8 |
| 13 | −8.27980 | 0.50000 | 2.00100 | 29.1 |
| 14 | 17.89910 | 2.73220 | 1.66998 | 39.2 |
| 15 | −20.72260 | 0.30000 | | |
| 16 | 43.68350 | 3.41130 | 1.49700 | 81.6 |
| 17 | −12.42470 | Variable | | |
| 18 | −150.19200 | 2.22060 | 1.94595 | 18.0 |
| 19 | −16.39950 | 0.70000 | 1.84666 | 23.8 |
| 20 | 27.17990 | Variable | | |
| 21* | 28.65860 | 3.79200 | 1.58313 | 59.4 |
| 22* | −17.90750 | 1.01760 | | |
| 23 | −31.37720 | 0.50000 | 1.84666 | 23.8 |
| 24 | 11.76450 | 3.07710 | 1.62041 | 60.3 |
| 25 | 34.33290 | Variable | | |
| 26 | 38.17780 | 2.55220 | 1.94595 | 18.0 |
| 27 | −468.82330 | BF | | |
| Image surface | ∞ | | | |

TABLE 5

(Aspheric Surface Data)

3rd surface

K = −3.22406E+00, A4 = 9.62901E−05, A6 = −1.09395E−06,
A8 = 7.26659E−09 A10 = −2.73565E−11, A12 = 4.27081E−14

4th surface

K = −5.59666E−01, A4 = −9.80031E−06, A6 = −1.57644E−06,
A8 = 8.68100E−09 A10 = −3.34196E−11, A12 = 0.00000E+00

9th surface

K = 0.00000E+00, A4 = −1.08456E−05, A6 = 2.28455E−06,
A8 = 3.00895E−08 A10 = 2.08854E−11, A12 = 0.00000E+00

10th surface

K = 0.00000E+00, A4 = 6.74198E−05, A6 = 2.36085E−06,
A8 = 2.17392E−08 A10 = 4.28066E−10, A12 = 0.00000E+00

21st surface

K = 0.00000E+00, A4 = −5.28314E−06, A6 = 1.58289E−08,
A8 = 1.15550E−09 A10 = −1.64200E−11, A12 = 0.00000E+00

22nd surface

K = 0.00000E+00, A4 = 7.58409E−05, A6 = −1.29333E−07,
A8 = 1.84938E−09 A10 = −2.08114E−11, A12 = 0.00000E+00

(Various Data in Infinity Focusing State)

TABLE 6A (Various Data)
Zoom ratio 2.09891

| | Wide angle | Intermediate | Telephoto |
|---|---|---|---|
| Focal length | 8.2899 | 11.4898 | 17.3997 |
| F number | 2.90024 | 3.60083 | 4.00060 |

TABLE 6A-continued (Various Data)
Zoom ratio 2.09891

|  | Wide angle | Intermediate | Telephoto |
|---|---|---|---|
| Angle of view | 53.0580 | 42.6626 | 31.6270 |
| Image height | 10.0000 | 10.3000 | 10.8150 |
| Total lens length | 102.5683 | 93.7470 | 90.2153 |
| BF | 13.79837 | 13.79831 | 13.79791 |
| d8 | 23.2565 | 11.6486 | 1.9760 |
| d17 | 1.5000 | 3.8672 | 7.4509 |
| d20 | 8.4481 | 6.0840 | 2.4981 |
| d25 | 1.0035 | 3.7871 | 9.9306 |
| Entrance pupil position | 15.3994 | 14.3240 | 12.8344 |
| Exit pupil position | −40.5098 | −49.4766 | −84.1573 |
| Front principal point | 22.4239 | 23.7274 | 27.1435 |
| Rear principal point | 94.2784 | 82.2572 | 72.8156 |

TABLE 6B (Data of Single Lens)

| Lens | First surface | Focal length |
|---|---|---|
| 1 | 1 | −37.2663 |
| 2 | 3 | −35.5759 |
| 3 | 5 | −24.9815 |
| 4 | 7 | 28.3347 |
| 5 | 9 | 39.5386 |
| 6 | 12 | 10.4430 |
| 7 | 13 | −5.6019 |
| 8 | 14 | 14.7532 |
| 9 | 16 | 19.8646 |
| 10 | 18 | 19.3059 |
| 11 | 19 | −11.9922 |
| 12 | 21 | 19.4842 |
| 13 | 23 | −10.0526 |
| 14 | 24 | 27.4161 |
| 15 | 26 | 37.4119 |

TABLE 6C (Data of Zoom Lens Groups)

| Group | First surface | Focal length | Lens configuration length | Front principal point | Rear principal point |
|---|---|---|---|---|---|
| 1 | 1 | −14.38422 | 24.07610 | 4.88869 | 10.94703 |
| 2 | 9 | 17.12409 | 16.62620 | 10.19911 | 14.07501 |
| 3 | 18 | −31.66821 | 2.92060 | 1.27829 | 2.69058 |
| 4 | 21 | −170.70338 | 8.38670 | 31.34543 | 30.08659 |
| 5 | 26 | 37.41186 | 2.55220 | 0.09900 | 1.33644 |

TABLE 6D (Magnification of Zoom Lens Groups)

| Group | First surface | Wide angle | Intermediate | Telephoto |
|---|---|---|---|---|
| 1 | 1 | 0.00000 | 0.00000 | 0.00000 |
| 2 | 9 | −0.39056 | −0.53120 | −0.75890 |
| 3 | 18 | 2.40173 | 2.40923 | 2.46849 |
| 4 | 21 | 1.02625 | 1.04256 | 1.07854 |
| 5 | 26 | 0.59868 | 0.59868 | 0.59869 |

Numerical Practical Example 3

The imaging optical system in numerical practical example 3 corresponds to the third exemplary embodiment shown in FIG. 7. Table 7 shows surface data and Table 8 shows aspheric surface data of the imaging optical system in numerical practical example 3. Table 9A to Table 9D show various data in the infinity focusing state.

TABLE 7

(Surface Data)

| Surface No. | r | d | nd | vd |
|---|---|---|---|---|
| Object surface | ∞ |  |  |  |
| 1 | 42.14050 | 2.00000 | 1.83481 | 42.7 |
| 2 | 19.87140 | 3.09580 |  |  |
| 3* | 14.24260 | 2.00000 | 1.78340 | 48.4 |
| 4* | 8.58090 | 12.30750 |  |  |
| 5 | −55.09770 | 3.39960 | 1.53992 | 65.4 |
| 6 | 23.27210 | 0.60040 |  |  |
| 7 | 23.27210 | 3.64940 | 1.78134 | 26.5 |
| 8 | 169.46450 | Variable |  |  |
| 9* | −34.47610 | 3.83930 | 1.58575 | 59.5 |
| 10* | −16.44720 | 0.30000 |  |  |
| 11 (aperture) | ∞ | 7.39240 |  |  |
| 12 | −169.34800 | 2.73700 | 1.84664 | 25.5 |
| 13 | −10.20060 | 0.50000 | 2.00100 | 29.1 |
| 14 | 14.78500 | 3.43910 | 1.65672 | 56.7 |
| 15 | −22.85490 | 0.30000 |  |  |
| 16 | 31.79770 | 7.99060 | 1.49700 | 81.6 |
| 17 | −15.24260 | Variable |  |  |
| 18 | 76.78620 | 3.06000 | 1.94595 | 18.0 |
| 19 | −20.58310 | 0.70000 | 1.84570 | 32.5 |
| 20 | 34.45680 | Variable |  |  |
| 21* | 29.31280 | 3.68450 | 1.48700 | 70.4 |
| 22* | −17.86850 | 1.00000 |  |  |
| 23 | −18.84800 | 0.70000 | 1.83338 | 29.4 |
| 24 | 11.41980 | 3.48720 | 1.57884 | 62.7 |
| 25 | −175.09020 | BF |  |  |
| Image surface | ∞ |  |  |  |

TABLE 8

(Aspheric Surface Data)

3rd surface

K = −1.09991E+00, A4 = 4.72872E−05, A6 = −9.32205E−07,
A8 = 7.99627E−09 A10 = −3.01266E−11, A12 = 4.27081E−14

4th surface

K = −5.87632E−01, A4 = 3.18731E−05, A6 = −2.19619E−06,
A8 = 1.92127E−08 A10 = −7.25028E−11, A12 = −3.66905E−25

9th surface

K = 9.55981E+00, A4 = −8.28244E−05, A6 = 6.86734E−07,
A8 = −1.19701E−08 A10 = 2.33270E−10, A12 = 1.17058E−30

10th surface

K = 4.68714E−01, A4 = −1.61378E−05, A6 = 3.87331E−07,
A8 = −3.60392E−09 A10 = 8.92024E−11, A12 = 1.50418E−27

21st surface

K = 1.73261E+00, A4 = 2.05696E−05, A6 = −2.28506E−07,
A8 = 4.59923E−09 A10 = −2.77250E−11, A12 = −2.77381E−24

22nd surface

K = −1.47623E−01, A4 = 8.00543E−05, A6 = −6.07163E−07,
A8 = 6.05844E−09 A10 = −3.82506E−11, A12 = −3.53748E−26

(Various Data in Infinity Focusing State)

TABLE 9A (Various Data)
Zoom ratio 2.08459

|  | Wide angle | Intermediate | Telephoto |
|---|---|---|---|
| Focal length | 8.2926 | 11.4941 | 17.2867 |
| F number | 2.91114 | 3.66667 | 3.99781 |

TABLE 9A-continued (Various Data)
Zoom ratio 2.08459

|  | Wide angle | Intermediate | Telephoto |
|---|---|---|---|
| Angle of view | 53.4394 | 42.7527 | 31.8532 |
| Image height | 10.0000 | 10.3000 | 10.8150 |
| Total lens length | 112.8294 | 103.3385 | 97.3558 |
| BF | 16.52014 | 19.83997 | 24.71575 |
| d8 | 27.1193 | 13.5206 | 0.9620 |
| d17 | 1.0000 | 1.3035 | 3.4953 |
| d20 | 2.0072 | 2.4916 | 2.0000 |
| Entrance pupil position | 17.7697 | 16.5695 | 14.6835 |
| Exit pupil position | −26.5140 | −26.7090 | −26.8778 |
| Front principal point | 24.4643 | 25.2254 | 26.1782 |
| Rear principal point | 104.5368 | 91.8444 | 80.0692 |

TABLE 9B (Data of Single Lens)

| Lens | First surface | Focal length |
|---|---|---|
| 1 | 1 | −46.9631 |
| 2 | 3 | −32.6156 |
| 3 | 5 | −29.8493 |
| 4 | 7 | 34.1523 |
| 5 | 9 | 49.7787 |
| 6 | 12 | 12.7203 |
| 7 | 13 | −5.9703 |
| 8 | 14 | 14.1839 |
| 9 | 16 | 21.9705 |
| 10 | 18 | 17.4258 |
| 11 | 19 | −15.1484 |
| 12 | 21 | 23.3937 |
| 13 | 23 | −8.4442 |
| 14 | 24 | 18.6485 |

TABLE 9C (Data of Zoom Lens Groups)

| Group | First surface | Focal length | Lens configuration length | Front principal point | Rear principal point |
|---|---|---|---|---|---|
| 1 | 1 | −16.70429 | 27.05270 | 5.46397 | 10.04283 |
| 2 | 9 | 20.96767 | 26.49840 | 17.63042 | 21.82859 |
| 3 | 18 | −146.74862 | 3.76000 | 5.89553 | 7.55424 |
| 4 | 21 | −66.66616 | 8.87170 | 9.82075 | 11.84912 |

TABLE 9D (Magnification of Zoom Lens Groups)

| Group | First surface | Wide angle | Intermediate | Telephoto |
|---|---|---|---|---|
| 1 | 1 | 0.00000 | 0.00000 | 0.00000 |
| 2 | 9 | −0.36468 | −0.47765 | −0.66906 |
| 3 | 18 | 1.13145 | 1.14976 | 1.16640 |
| 4 | 21 | 1.20314 | 1.25294 | 1.32608 |

Numerical Practical Example 4

The imaging optical system in numerical practical example 4 corresponds to the fourth exemplary embodiment shown in FIG. 10. Table 10 shows surface data and Table 11 shows aspheric surface data of the imaging optical system in numerical practical example 4. Table 12A to Table 12D show various data in the infinity focusing state.

TABLE 10

(Surface Data)

| Surface No. | r | d | nd | νd |
|---|---|---|---|---|
| Object surface | ∞ | | | |
| 1 | 41.23080 | 1.20000 | 1.81465 | 42.1 |
| 2 | 16.71000 | 3.44280 | | |
| 3* | 15.51190 | 1.50000 | 1.73714 | 53.6 |
| 4* | 9.02220 | 8.81690 | | |
| 5 | −89.45710 | 0.70000 | 1.43700 | 95.1 |
| 6 | 16.20610 | 1.97060 | | |
| 7 | 18.38020 | 6.98460 | 1.83980 | 34.5 |
| 8 | 73.07460 | 0.70000 | 1.61572 | 60.6 |
| 9 | 33.81860 | Variable | | |
| 10* | 227.99030 | 4.79360 | 1.70229 | 47.6 |
| 11 | −25.07710 | 0.88760 | | |
| 12 (aperture) | ∞ | 3.33990 | | |
| 13 | −43.85500 | 2.24970 | 1.83948 | 21.3 |
| 14 | −9.73460 | 0.50000 | 1.99985 | 29.1 |
| 15 | 16.82390 | 2.84120 | 1.68256 | 49.9 |
| 16 | −18.86360 | 0.30000 | | |
| 17 | 28.76350 | 3.22340 | 1.49700 | 81.5 |
| 18 | −15.20160 | Variable | | |
| 19 | −2735.91570 | 2.70910 | 1.94607 | 18.0 |
| 20 | −13.03090 | 0.70000 | 1.91026 | 23.8 |
| 21 | 25.05610 | Variable | | |
| 22* | 23.80030 | 3.62320 | 1.55352 | 64.4 |
| 23 | −23.82020 | 0.72340 | | |
| 24 | −122.91910 | 0.50000 | 1.85513 | 29.2 |
| 25 | 12.07700 | 2.62370 | 1.60232 | 61.3 |
| 26 | 26.00000 | Variable | | |
| 27* | 36.36540 | 2.31730 | 1.82115 | 24.1 |
| 28* | 667.87540 | BF | | |
| Image surface | ∞ | | | |

TABLE 11

(Aspheric Surface Data)

3rd surface

K = −2.96056E+00, A4 = 9.31763E−05, A6 = −9.55483E−07,
A8 = 6.19211E−09 A10 = −2.50016E−11, A12 = 4.27081E−14

4th surface

K = −5.64310E−01, A4 = −9.01357E−06, A6 = −1.29278E−06,
A8 = 5.16435E−09 A10 = −2.42864E−11, A12 = 0.00000E+00

10th surface

K = 0.00000E+00, A4 = −6.71562E−05, A6 = −1.32428E−07,
A8 = −8.19736E−11 A10 = 0.00000E+00, A12 = 0.00000E+00

22nd surface

K = 0.00000E+00, A4 = −5.04160E−05, A6 = −5.48566E−08,
A8 = −6.62282E−11 A10 = 0.00000E+00, A12 = 0.00000E+00

27th surface

K = 0.00000E+00, A4 = 9.09316E−06, A6 = 2.10645E−07,
A8 = −2.20460E−09 A10 = 0.00000E+00, A12 = 0.00000E+00

28th surface

K = 0.00000E+00, A4 = 1.95692E−05, A6 = 2.05369E−07,
A8 = −2.72082E−09 A10 = 1.26295E−12, A12 = 0.00000E+00

TABLE 12A (Various Data)
Zoom ratio 2.10139

|  | Wide angle | Intermediate | Telephoto |
|---|---|---|---|
| Focal length | 8.3823 | 11.6241 | 17.6145 |
| F number | 2.93252 | 3.64247 | 4.04959 |
| Angle of view | 52.5951 | 42.3035 | 31.2664 |
| Image height | 10.0000 | 10.3000 | 10.8150 |

TABLE 12A-continued (Various Data)

Zoom ratio 2.10139

| | Wide angle | Intermediate | Telephoto |
|---|---|---|---|
| Total lens length | 102.7522 | 94.2504 | 92.2115 |
| BF | 14.19636 | 14.24169 | 14.37416 |
| d9 | 21.2511 | 9.9072 | 0.8830 |
| d18 | 1.5000 | 3.9101 | 7.0522 |
| d21 | 7.9817 | 5.5755 | 2.4310 |
| d26 | 1.1732 | 3.9661 | 10.8213 |
| Entrance pupil position | 14.8535 | 13.8785 | 12.6140 |
| Exit pupil position | −37.3271 | −42.6751 | −66.1200 |
| Front principal point | 21.8721 | 23.1286 | 26.3739 |
| Rear principal point | 94.3699 | 82.6262 | 74.5969 |

TABLE 12B (Data of Single Lens)

| Lens | First surface | Focal length |
|---|---|---|
| 1 | 1 | −35.2648 |
| 2 | 3 | −32.4364 |
| 3 | 5 | −31.3338 |
| 4 | 7 | 27.6306 |
| 5 | 8 | −102.9423 |
| 6 | 10 | 32.4224 |
| 7 | 13 | 14.4690 |
| 8 | 14 | −6.1099 |
| 9 | 15 | 13.4634 |
| 10 | 17 | 20.5102 |
| 11 | 19 | 13.8330 |
| 12 | 20 | −9.3359 |
| 13 | 22 | 22.1073 |
| 14 | 24 | −12.8376 |
| 15 | 25 | 34.9662 |
| 16 | 27 | 46.7590 |

TABLE 12C (Data of Zoom Lens Groups)

| Group | First surface | Focal length | Lens configuration length | Front principal point | Rear principal point |
|---|---|---|---|---|---|
| 1 | 1 | −13.68222 | 25.31770 | 4.72453 | 11.33570 |
| 2 | 10 | 17.53077 | 18.13540 | 11.21268 | 14.59163 |
| 3 | 19 | −29.48849 | 3.40910 | 1.76961 | 3.42087 |
| 4 | 22 | −6174.75758 | 7.47030 | 929.79268 | 811.25672 |
| 5 | 27 | 46.75900 | 2.31730 | −0.07315 | 0.97381 |

TABLE 12D (Magnification of Zoom Lens Groups)

| Group | First surface | Wide angle | Intermediate | Telephoto |
|---|---|---|---|---|
| 1 | 1 | 0.00000 | 0.00000 | 0.00000 |
| 2 | 10 | −0.41155 | −0.56092 | −0.78864 |
| 3 | 19 | 2.55171 | 2.59862 | 2.80900 |
| 4 | 22 | 0.87377 | 0.87424 | 0.87540 |
| 5 | 27 | 0.66766 | 0.66669 | 0.66386 |

Values Corresponding to Conditions

Table 13 below shows values corresponding to conditions (1) to (5).

TABLE 13

| | | Numerical practical example 1 | Numerical practical example 2 | Numerical practical example 3 | Numerical practical example 4 |
|---|---|---|---|---|---|
| Condition (1) | fG1/fG4 | 0.10 | 0.08 | 0.25 | 0.00 |
| Condition (2) | N1n | 1.55 | 1.50 | 1.54 | 1.44 |
| Condition (3) | v1n | 75.50 | 81.61 | 65.43 | 95.10 |
| Condition (4) | N2n | 2.00 | 2.00 | 2.00 | 2.00 |
| Condition (5) | v3p | 17.98 | 17.98 | 17.98 | 17.98 |

The imaging optical system of the present disclosure is typically applicable to digital still cameras, digital cameras with interchangeable lens system, digital video cameras, cameras of mobile phones, cameras of PDAs (Personal Digital Assistances), cameras of smartphones, monitoring cameras in monitoring systems, web cameras, and vehicle-mounted cameras. In particular, the present disclosure is suitable for imaging optical systems that require high picture quality, such as digital still camera systems and digital video camera systems.

What is claimed is:

1. An imaging optical system, in order from an object side to an image side, comprising:
   a first lens group having negative optical power;
   a second lens group having positive optical power;
   a third lens group having negative optical power; and
   a fourth lens group having negative optical power, wherein
   a lens disposed closest to the object side in the second lens group has a concave surface directed toward the object side,
   a lens disposed closest to the object side in the fourth lens group has positive optical power, and
   each distance between the lens groups changes when zooming from a wide-angle end to a telephoto end on photographing.

2. The imaging optical system of claim 1, wherein condition (1) below is satisfied:
$$0.01 < fG1/fG4 < 0.7 \qquad (1)$$
where
fG1 is a focal length of the first lens group, and
fG4 is a focal length of the fourth lens group.

3. The imaging optical system of claim 1, wherein
the first lens group includes at least a set of cemented lenses comprising a lens having positive optical power and a lens having negative optical power, and
condition (2) below is satisfied:
$$1.4 < N1n < 1.65 \qquad (2)$$
where
N1n is a refractive index to a d-line of the lens having negative optical power of the cemented lenses.

4. The imaging optical system of claim 1, wherein
the first lens group includes at least a set of cemented lenses comprising a lens having positive optical power and a lens having negative optical power, and
condition (3) below is satisfied:
$$60 < v1n < 100 \qquad (3)$$
where
v1n is an Abbe number to a d-line of the lens having negative optical power of the cemented lenses.

5. The imaging optical system of claim 1,
wherein
the second lens group includes cemented lenses comprising, in order from the object side to the image side, a lens having positive optical power, a lens having negative optical power, and a lens having positive optical power.

6. The imaging optical system of claim 1,
wherein
the second lens group includes at least one negative lens, and
condition (4) below is satisfied:

$$1.85 < N2n \tag{4}$$

where
N2n is a refractive index to a d-line of the negative lens.

7. The imaging optical system of claim 1,
wherein
the third lens group includes at least one positive lens, and
condition (5) below is satisfied:

$$14 < v3p < 35 \tag{5}$$

where
v3p is an Abbe number to a d-line of the positive lens.

8. A camera system comprising:
an interchangeable lens device including the imaging optical system of claim 1; and
a camera body detachable, via a camera mount, from the interchangeable lens device, the camera body including an image sensor for receiving an optical image of an object formed by the imaging optical system and converting the optical image to an electric image signal,
wherein
the interchangeable lens device forms the optical image of the object in the image sensor.

9. An imaging apparatus configured to convert an optical image of an object to an electric image signal and at least one of display and store a converted image signal, the imaging apparatus comprising:
the imaging optical system of claim 1 configured to form the optical image of the object; and
an image sensor configured to convert the optical image formed by the imaging optical system to the electric image signal.

* * * * *